(12) United States Patent
Vanich et al.

(10) Patent No.: US 10,574,470 B2
(45) Date of Patent: Feb. 25, 2020

(54) CONVERTING POWER OVER ETHERNET INTO A USB STREAM AND SEPARATE POWER

(71) Applicant: EWC Technologies, LLC., Salt Lake City, UT (US)

(72) Inventors: Katatip Nino Vanich, West Jordan, UT (US); Zach Hazen, Layton, UT (US)

(73) Assignee: EWC Technologies, LLC, Salt Lake City, UT (US)

( * ) Notice: Subject to any disclaimer, the term of this patent is extended or adjusted under 35 U.S.C. 154(b) by 106 days.

(21) Appl. No.: 15/958,681

(22) Filed: Apr. 20, 2018

(65) Prior Publication Data

US 2019/0327099 A1 Oct. 24, 2019

(51) Int. Cl.
| | | |
|---|---|---|
| *H04L 12/10* | (2006.01) | |
| *G06F 1/26* | (2006.01) | |
| *H04L 29/06* | (2006.01) | |
| *H04L 12/413* | (2006.01) | |
| *G06F 13/42* | (2006.01) | |
| *H04L 12/40* | (2006.01) | |
| *G06F 13/38* | (2006.01) | |
| *H02J 3/00* | (2006.01) | |

(52) U.S. Cl.
CPC ............. *H04L 12/10* (2013.01); *G06F 1/266* (2013.01); *G06F 1/26* (2013.01); *G06F 13/385* (2013.01); *G06F 13/387* (2013.01); *G06F 13/42* (2013.01); *G06F 13/4221* (2013.01); *G06F 13/4282* (2013.01); *G06F 2213/0042* (2013.01); *H02J 3/00* (2013.01); *H04L 12/40045* (2013.01); *H04L 12/413* (2013.01); *H04L 69/08* (2013.01); *Y02D 30/30* (2018.01); *Y02D 30/32* (2018.01); *Y10T 29/49826* (2015.01)

(58) Field of Classification Search
CPC ........ G06F 1/26; G06F 1/266; G06F 13/4282; G06F 13/387; G06F 13/42; G06F 13/4221; G06F 2213/0042; G06F 13/385; H02J 2007/0062; H02J 13/0096; H02J 2007/0001; H02J 2007/0059; H02J 3/00; H02J 7/0052; H04L 12/413; H04L 12/10; H04L 69/08; H04L 12/40045; Y10T 29/49826; Y02D 30/30; Y02D 30/32
See application file for complete search history.

(56) References Cited

U.S. PATENT DOCUMENTS

| | | | | |
|---|---|---|---|---|
| 2013/0301301 A1* | 11/2013 | Fischer | ................. | H04L 12/413 363/15 |
| 2015/0063550 A1* | 3/2015 | Wojcik | ................. | A61B 6/4233 378/189 |
| 2015/0106536 A1* | 4/2015 | Lauby | ................. | G06F 13/4221 710/8 |

(Continued)

OTHER PUBLICATIONS

MSTronic Co., Ltd., "MIT-76G-USB Gigabit PoE to USB3.0 Adapter", available at http://www.mse.com.tw/comm/upfile/p_170716_02040.pdf.

*Primary Examiner* — Terrell S Johnson
(74) *Attorney, Agent, or Firm* — Kirton McConkie; Brian Tucker (57) ABSTRACT

Power over Ethernet (POE) can be converted into a USB stream and separate power. With these techniques, the benefits of POE can be obtained without requiring a terminal to be POE-enabled and without employing a terminal's Ethernet port. Many more terminals may therefore be powered via POE.

20 Claims, 7 Drawing Sheets

(56) References Cited

U.S. PATENT DOCUMENTS

2015/0311753 A1* 10/2015 Scifres ................ H02J 13/0096
　　　　　　　　　　　　　　　　　　　　　713/300
2015/0331821 A1* 11/2015 Liston ................... G06F 13/387
　　　　　　　　　　　　　　　　　　　　　710/106
2016/0370835 A1　12/2016 Erickson et al.

* cited by examiner

FIG. 3A ably, the present invention enables terminal 130 to benefit

CONVERTING POWER OVER ETHERNET INTO A USB STREAM AND SEPARATE POWER

CROSS-REFERENCE TO RELATED APPLICATIONS

N/A

BACKGROUND

Power over Ethernet (POE) refers to various standards for providing both power and data on an Ethernet cable. With POE, a device can receive data and be powered from the same cable. Universal POE (UPOE) is a relatively newer technique developed by Cisco which enables up to 60 Watts to be delivered per port. UPOE therefore allows a much greater number and type of devices to be powered via an Ethernet cable.

BRIEF SUMMARY

The present invention extends to techniques for converting Power over Ethernet into a USB stream and separate power. With these techniques, the benefits of POE can be obtained without requiring a terminal to be POE-enabled and without employing a terminal's Ethernet port. Many more terminals may therefore be powered via POE.

In one embodiment, the present invention is implemented as a POE conversion device that includes: an Ethernet port by which the POE conversion device receives an incoming POE stream; a USB port; a power output; a power module; and a USB conversion module. The power module is coupled to the Ethernet port to receive the incoming POE stream, and is configured to extract power from the incoming POE stream to form an incoming Ethernet stream and provide the power to the power output. The USB conversion module is configured to convert the incoming Ethernet stream into an incoming USB stream with an Ethernet payload and then output the incoming USB stream with the Ethernet payload via the USB port.

In another embodiment, the present invention is implemented as a POE conversion device that includes: an Ethernet port by which the POE conversion device receives an incoming POE stream; a USB port; a power module; and a USB conversion module. The power module is coupled to the Ethernet port to receive the incoming POE stream, and is configured to extract power from the incoming POE stream to form an incoming Ethernet stream and separate power. The USB conversion module is configured to convert the incoming Ethernet stream into an incoming USB stream with an Ethernet payload and then output the incoming USB stream with the Ethernet payload and the separate power via the USB port.

In another embodiment, the present invention is implemented by a POE conversion device that includes an Ethernet port and a USB port as a method for converting a POE stream. The POE conversion device receives an incoming POE stream and extracts power from the incoming POE stream to form an incoming Ethernet stream. The POE conversion device converts the incoming Ethernet stream into an incoming USB stream with an Ethernet payload and outputs the USB stream with the Ethernet payload to an external device via the USB port. The POE conversion device also outputs the power to the external device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "POE stream" shall be construed as communications that conform to a POE standard. The term "Ethernet stream" shall be construed as communications that conform to the Ethernet standard but that are not a POE stream. The term "USB stream with an Ethernet Payload" shall be construed as USB communications that include in their payload data formatted in accordance with the Ethernet standard.

Figure 1:
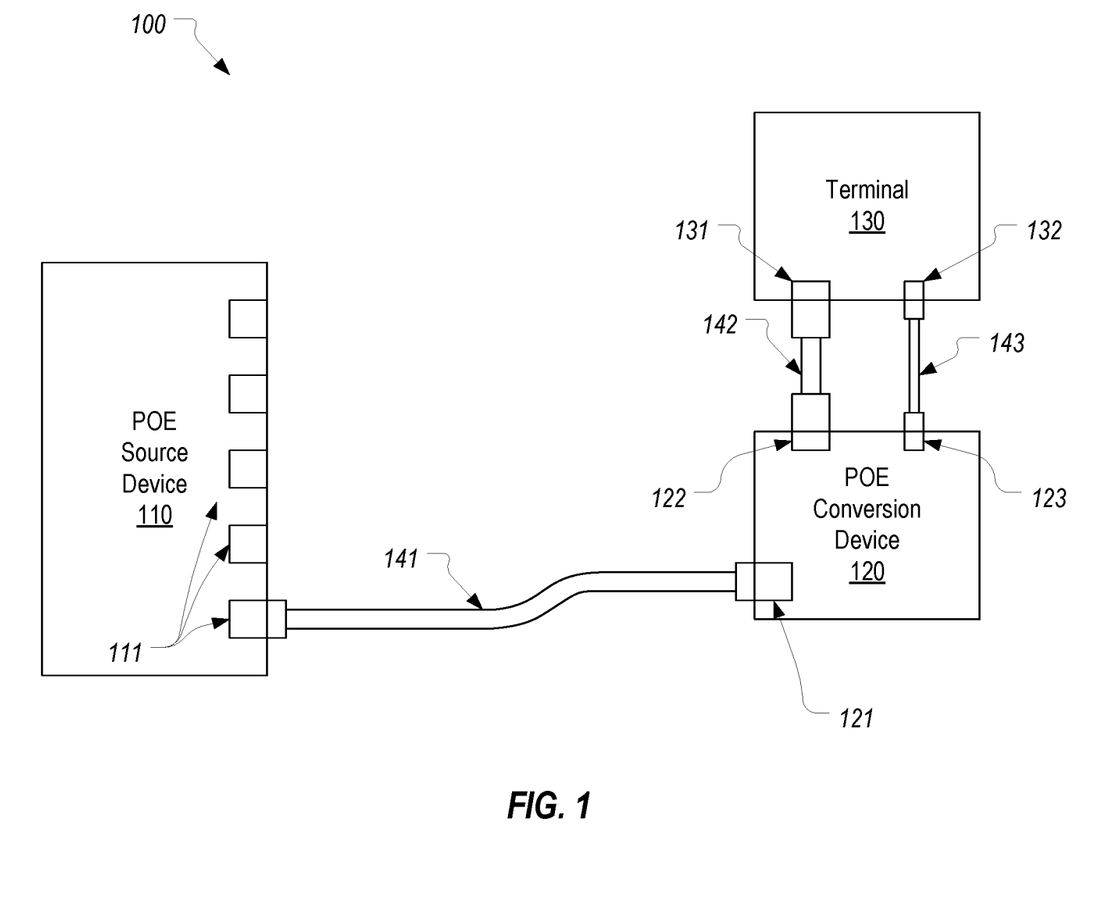
FIG. 1 illustrates an example computing environment in which a POE conversion device can be employed.

FIG. 1 illustrates an example computing environment 100 in which embodiments of the present invention can be implemented and employed. Environment 100 includes a POE source device 110, a POE conversion device 120, and a terminal 130. POE source device 110 may typically be a POE-enabled switch or other type of networking device, but may be any type of computing device capable of providing POE (e.g., a POE injector, POE extender, POE hub, etc.). POE source device 110 is shown as including a number of Ethernet ports 111 and is assumed to be a UPOE switch in the remainder of this description.

Terminal 130 can represent any computing device that includes a USB port 131 and a power input 132 (e.g., a DC power jack). As an example, terminal 130 can represent a circuit board such as the Intel NUC (Next Unit of Computing) board or a similar circuit board for a small form factor desktop computing device. Although not shown, terminal 130 can include a number of other input and output ports including additional USB ports, an Ethernet port, an HDMI or other display port, etc. Any of these output ports could be configured to power an external component (e.g., a display) using power received via power input 132.

POE conversion device 120 functions as an intermediary between POE source device 110 and terminal 130 to allow terminal 130 to receive data and power via POE. Importantly, the present invention enables terminal 130 to benefit from POE even if it is not POE enabled. Specifically, POE conversion device 120 includes an Ethernet port 121 and connects to an Ethernet port 111 of POE source device 110 via Ethernet cable 141. Ethernet port 121 functions as a POE input port to POE conversion device 120. POE conversion device 120 also includes a USB port 122 and a power output 123. A USB cable 142 can be employed to connect USB port 122 of POE conversion device 120 to USB port 131 of terminal 130. A power cable 143 can be employed to connect power output 123 of POE conversion device 120 to power input 132 of terminal 130. Although shown as separate components, for purposes of this description and the claims, USB port 122 and USB cable 142 could be construed as an integrated component while power output 123 and power cable 143 could be construed as an integrated component. In other words, POE conversion device 120 could be configured such that USB cable 142 and power cable 143 are not selectively removable from POE conversion device 120 but are integrated into the circuit board structure of POE conversion device 120.

Figure 2:
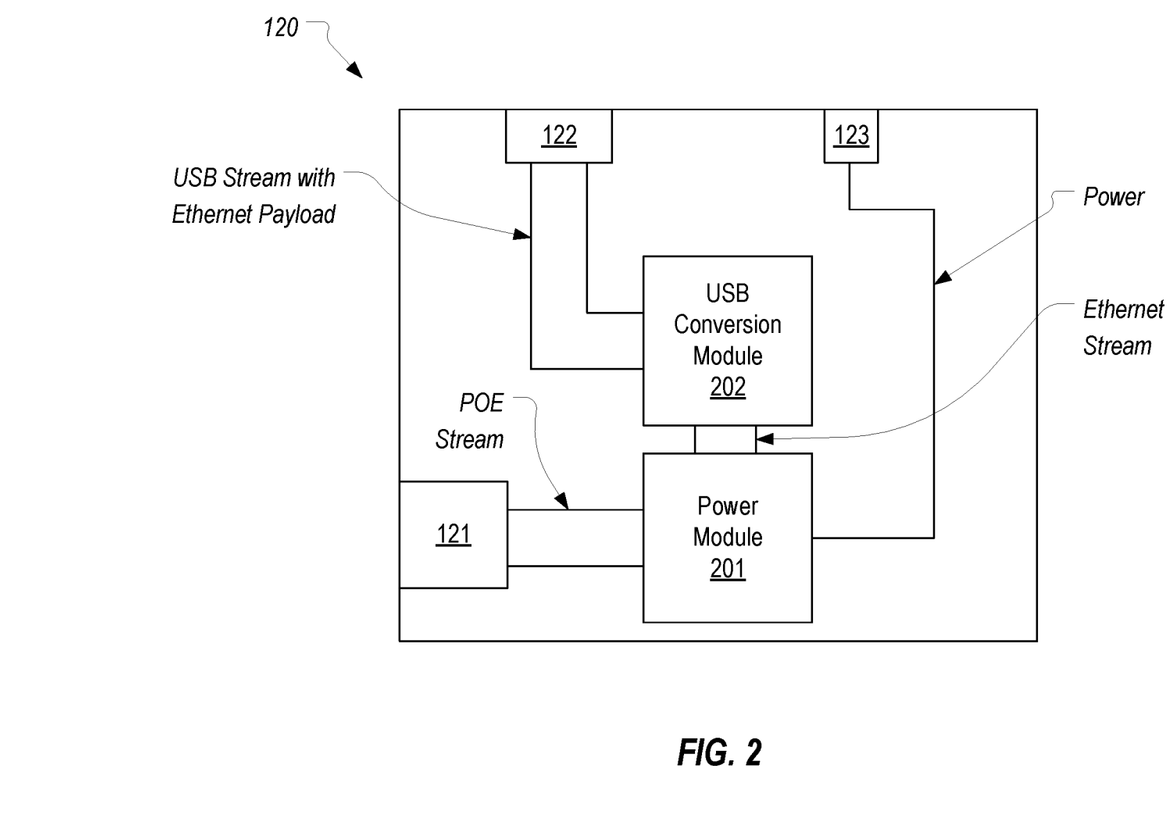
FIG. 2 illustrates an example architecture of a POE conversion device.

FIG. 2 illustrates an example architecture of POE conversion device 120. As shown, POE conversion device 120 includes a power module 201 and a USB conversion module 202. Although they are represented as two separate components, power module 210 and USB conversion module 202 could be integrated into a single physical component. The depicted power module 201 and USB conversion module 202 can therefore generally represent the different functionality performed within POE conversion device 120.

Power module 201 is coupled to Ethernet port 121. Therefore, when Ethernet port 121 is connected to POE source device 110, a POE stream will be provided to power module 201. This POE stream will include data formatted in accordance with the Ethernet standard and integrated power in accordance with the POE standard. Power module 201 receives the POE stream and performs two general functions: (1) it splits the power from the data in the POE stream; and (2) it converts the power to a particular level. Power module 201 provides the power to power output 123 and provides the data, which is still formatted in accordance with the Ethernet standard, to USB conversion module 202.

USB conversion module 202 receives this Ethernet stream and converts it into USB format. In particular, USB conversion module 202 generates USB formatted data that includes the Ethernet formatted data in its payload. In addition to converting the Ethernet data into USB format, USB conversion module 202 can also implement the USB protocol for communicating this USB formatted data to terminal 130 via USB port 122. Accordingly, the outputs of POE conversion device 120 include a USB stream with an Ethernet payload and separate power.

USB conversion module 202 can also be configured to receive USB formatted data from USB port 122, extract Ethernet formatted data from the USB stream and send the Ethernet data over Ethernet port 121. In other words, USB conversion module 202 works in both directions to allow an external device to be coupled to an Ethernet network via a USB port. When POE conversion device 120 is connected to terminal 130 via USB, USB conversion module 202 can be configured to implement plug-and-play techniques to cause a driver to be loaded on terminal 130 that is capable of converting the USB formatted data back to Ethernet data that can then be provided to the protocol stack in a typical manner. Therefore, the upper level components executing on terminal 130 can remain unaware of the USB conversion that is occurring on the Ethernet stream.

Although not shown, POE conversion device 120 can be configured to employ the power in the POE stream to power itself. Therefore, POE conversion device 120 will not need a separate source of power, but can be powered via a single Ethernet cable connected to Ethernet port 121. Also, because POE conversion device 120 provides power via power output 123 and data via USB port 122, the same single Ethernet cable can be used to provide power and data to an external device (e.g., terminal 130) even if the external device is not POE enabled (although the techniques of the present invention would still work even if the external device is POE enabled). As mentioned above, POE conversion device 120 could be used in conjunction with the Intel NUC (or similar) board and can therefore be configured as an add-on circuit board within a small form factor desktop computing device.

Figure 2A:
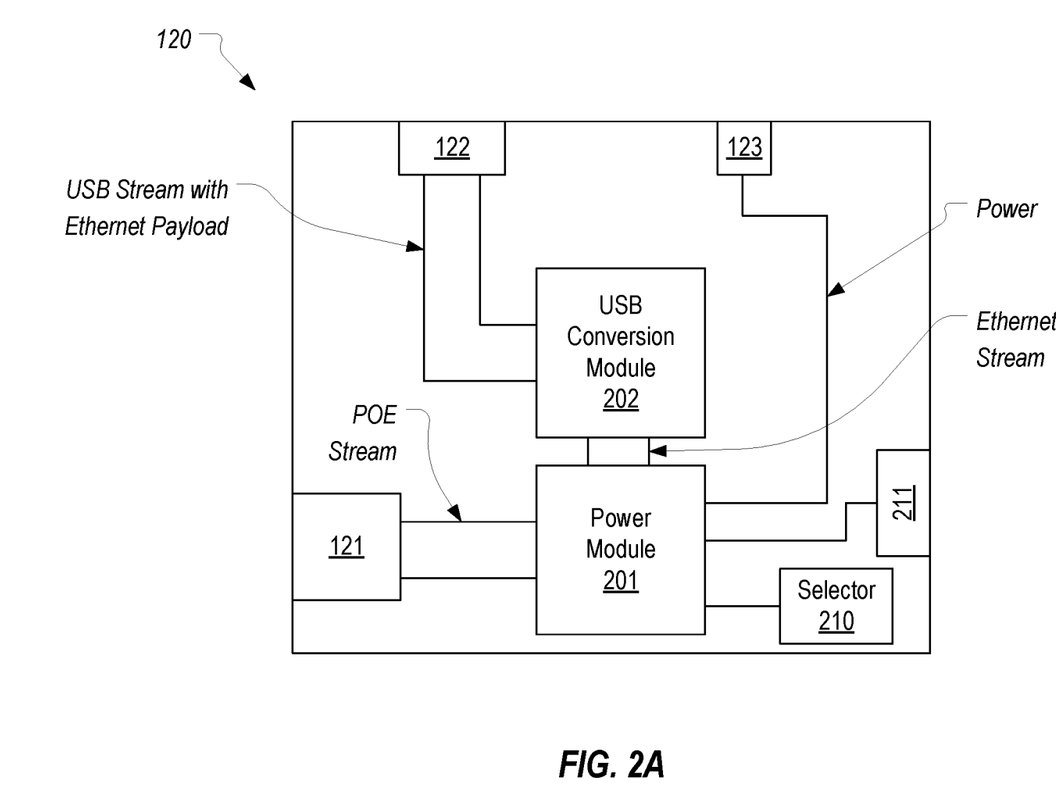
FIG. 2A illustrates another example architecture of the POE conversion device of FIG. 2.

FIG. 2A illustrates another example architecture of POE conversion device 120. In FIG. 2A, POE conversion device 120 is shown as including a selector 210 which may be in the form of a physical switch or other type of input device. Selector 210 can be employed to control the output voltage of the power supplied to power output 123. In other words, power module 201 can output a voltage level based on input from selector 210. In POE, the POE stream will typically carry around 48 V. However, the external device to which POE conversion device 120 may be coupled may require a different voltage input. For example, the Intel NUC board typically requires between 12 V and 24 V. Selector 210 can therefore enable an end user to control the voltage level of the power delivered via power output 123 (e.g., by having a position for 12 V, 24 V, etc.). Absent this conversion, the wrong voltage level (e.g., 48 V) may be applied to an external device's power input which could lead to damage. In some embodiments, power module 201 could be configured to automatically detect a voltage level required by an external device and then output the appropriate voltage (e.g., by sensing a signal provided by terminal 130 via power cable 143).

FIG. 2A also shows that POE conversion device 120 can include an additional USB port 211 in some embodiments. In such embodiments, in addition to providing the appropriate voltage to power output 123, power module 201 can generate and provide 5 V to USB port 211 so that it may be used to power or charge suitable devices.

Figure 2B:
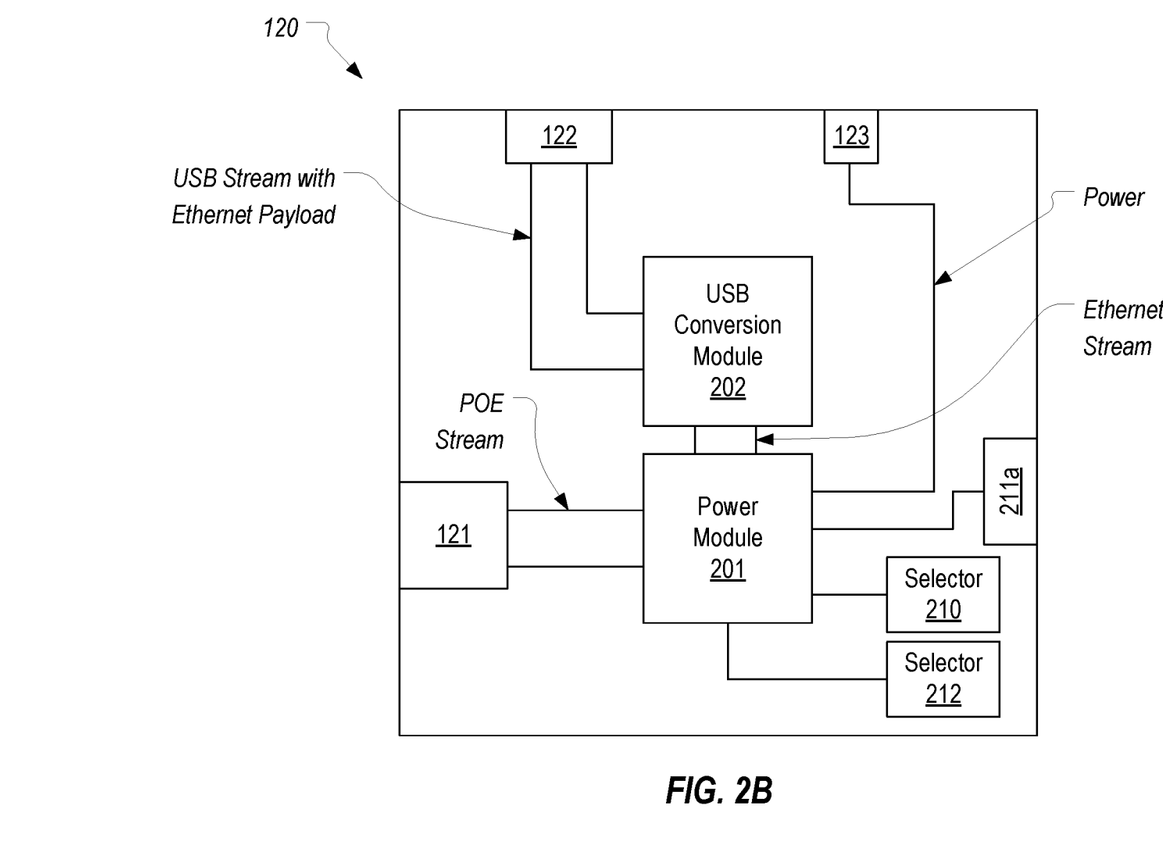
FIG. 2B illustrates another example architecture of the POE conversion device of FIG. 2.

FIG. 2B illustrates another example architecture of POE conversion device 120. In comparison to FIG. 2A, POE conversion device 120 includes an additional (or second) selector 212 that can function to control the voltage that power module 201 supplies to port 211*a*. Port 211*a* can represent any type of port including a USB port. As with selector 210, in some embodiments, selector 212 could be configured to automatically detect an appropriate voltage that should be supplied to port 211*a* as opposed to being a manual input device that allows the user to specify the voltage. Although FIG. 2B shows that both selectors 210 and 212 may be included, it some embodiments, only selector 212 may be included in POE conversion device 120. In other words, in some embodiments, the voltage provided to power output 123 may be preconfigured and fixed while the voltage provided to port 211*a* can be manually or automatically configured for a particular device that may be connected to the port. By incorporating port 211*a* and allowing a particular voltage to be supplied via the port, POE conversion device 120 could be employed to power a separate device (e.g., a monitor) from the device power via power output 123.

Figure 2C:
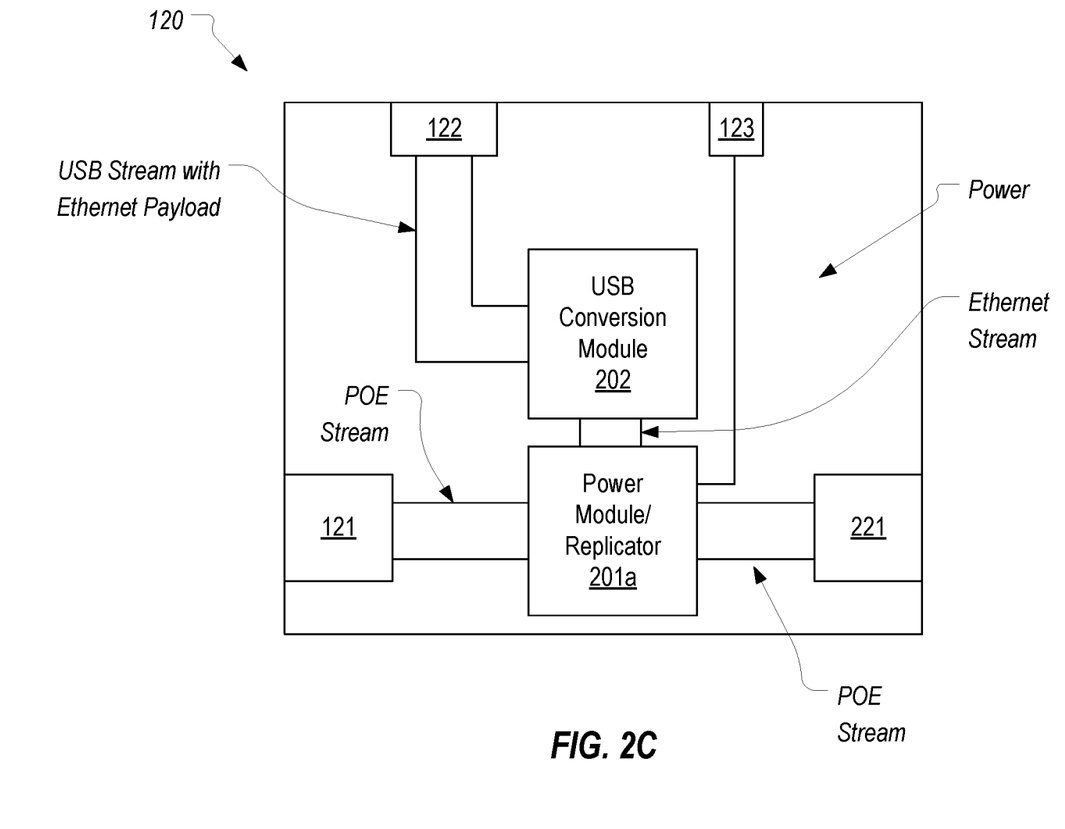
FIG. 2C illustrates another example architecture of the POE conversion device of FIG. 2.

FIG. 2C illustrates another example architecture of POE conversion device 120. In this embodiment, power module 201 is replaced/augmented with power module/replicator 201*a*. Power modulator/replicator 201*a* can function in the same manner described above to provide an Ethernet stream to USB conversion module 202 and a voltage to power output 123. Additionally, power module/replicator 201a can replicate the input POE stream to an output Ethernet port 221 in essence allowing the POE stream to pass through POE conversion device so that the POE stream can be supplied to another device. In this way, multiple POE conversion devices 120 could be connected in series or a POE conversion device 120 could be connected in series with another POE-enabled device. Given that many devices do not consume the full power capacity provided by POE, this technique can allow more devices to be powered and networked via a single port of a POE source device. From the networking perspective, power module/replicator 201a can implement multicasting techniques to ensure that data transferred via a POE stream will reach its intended recipient. In particular, because the data in the incoming POE stream will be replicated and sent towards both USB port 122 and Ethernet port 221, data targeting devices connected via either port will reach its intended destination. Likewise, power module/replicator 201a can transmit data travelling in the opposite direction to Ethernet port 121 to ensure that it can reach its intended destination.

The variations described above with reference to FIGS. 2A-2C can be used in isolation or in combination. For example, selector 210 could be incorporated into the embodiment shown in FIG. 2C. Therefore, the invention should not be limited to the specific examples shown in the figures.

Figure 3:
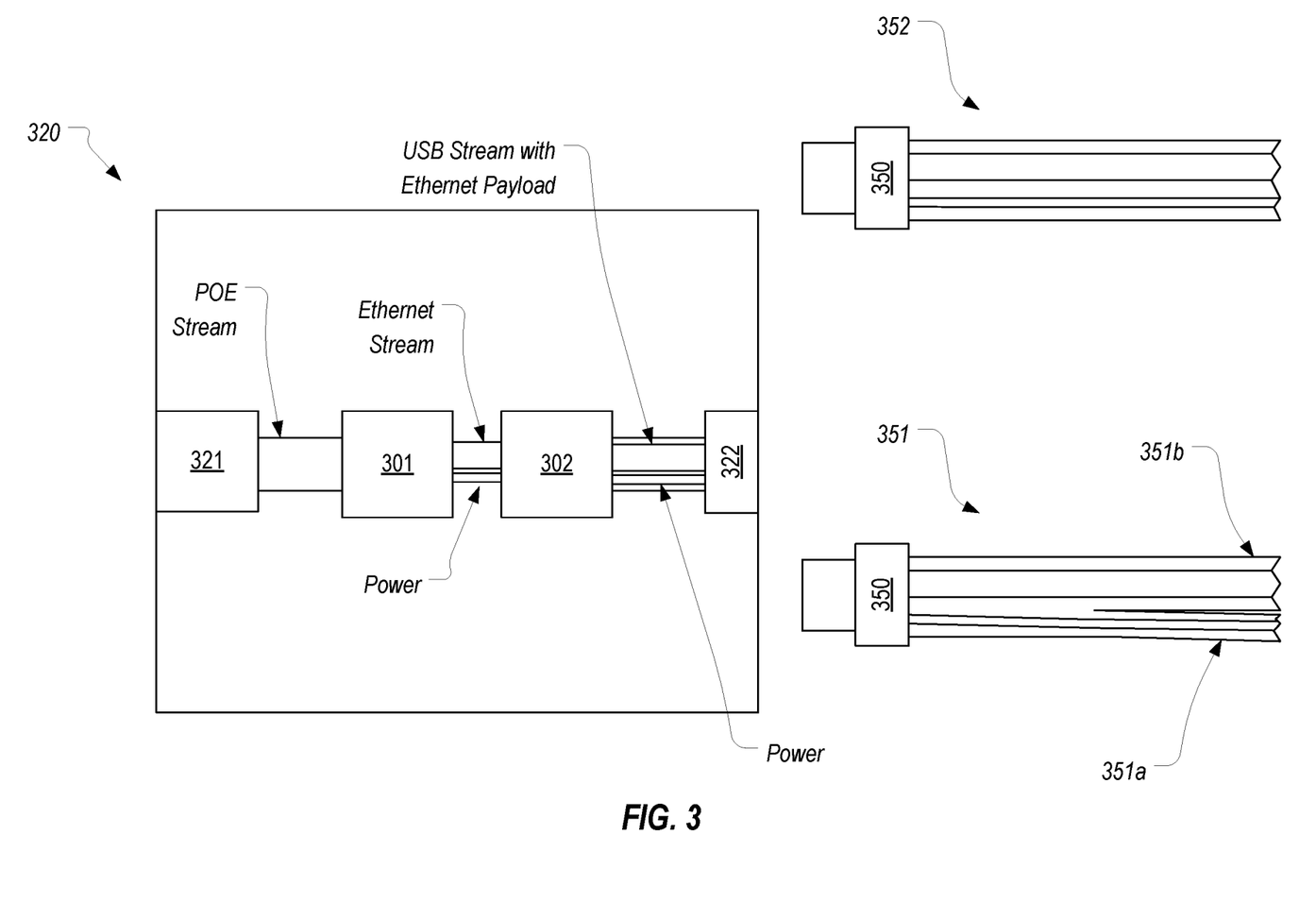
FIG. 3 illustrates an example architecture of another POE conversion device.

FIG. 3 illustrates an example architecture of a POE conversion device 320 that may be in the form of a dongle. POE conversion device 320 is substantially similar to POE conversion device 120 but is configured to employ a single USB port 322 to output the USB stream with an Ethernet payload and the power. As shown, POE conversion device 320 includes an Ethernet port 321 by which it may be connected to POE source device 110 to receive a POE stream. This POE stream is provided to power module 301 which functions in a similar manner as power module 301. Accordingly, power module 301 outputs an Ethernet stream and separate power (i.e., the power is no longer integrated into the Ethernet stream).

This Ethernet stream and separate power can then be provided to USB conversion module 302 which functions in a similar manner as USB conversion module 202 to output a USB stream that carries the Ethernet data in its payload and separate power. However, unlike USB conversion module 202, USB conversion module 302 integrates the power into the physical USB interface such that both the USB stream and the power are output via the same USB port 322. Importantly, this power will be converted from the POE stream to a voltage level suitable for the external device to which POE conversion device 320 is or will be connected. This voltage level will likely be higher than the typical 5 V that is supplied in accordance with the USB standard.

FIG. 3 also illustrates two possible cables 351, 352 that could be employed to connect POE conversion device 320 to an external device. Each of cables 351, 352 is in the form of a USB cable having a USB connector 350. However, unlike a USB cable, cables 351, 352 will be employed to provide a separate voltage level for powering the external device. In this context, "separate" refers to the fact that the external device requires a different voltage from the 5 V that the USB standard typically employs.

To accomplish this separate provision of the appropriate voltage level, cable 351 splits into a power cable 351a and a USB cable 351b. The power cable 351a can be coupled to one of the available pins of a standard USB connector by which USB conversion module 302 supplies the appropriate voltage for powering the external device. USB cable 351b can be structured in a typical fashion to provide the USB stream with the Ethernet payload via a USB port of the external device.

In some embodiments, the external device may be configured to receive a non-standard voltage via a USB connector. In such cases, cable 352 may be used. Cable 352 is the same as cable 351 except that it does not split into separate power and USB cables. Instead, cable 352 will provide the power at the necessary voltage level to the USB port of the external device which will be configured to extract the power from the corresponding pin of the USB port.

Figure 3A:
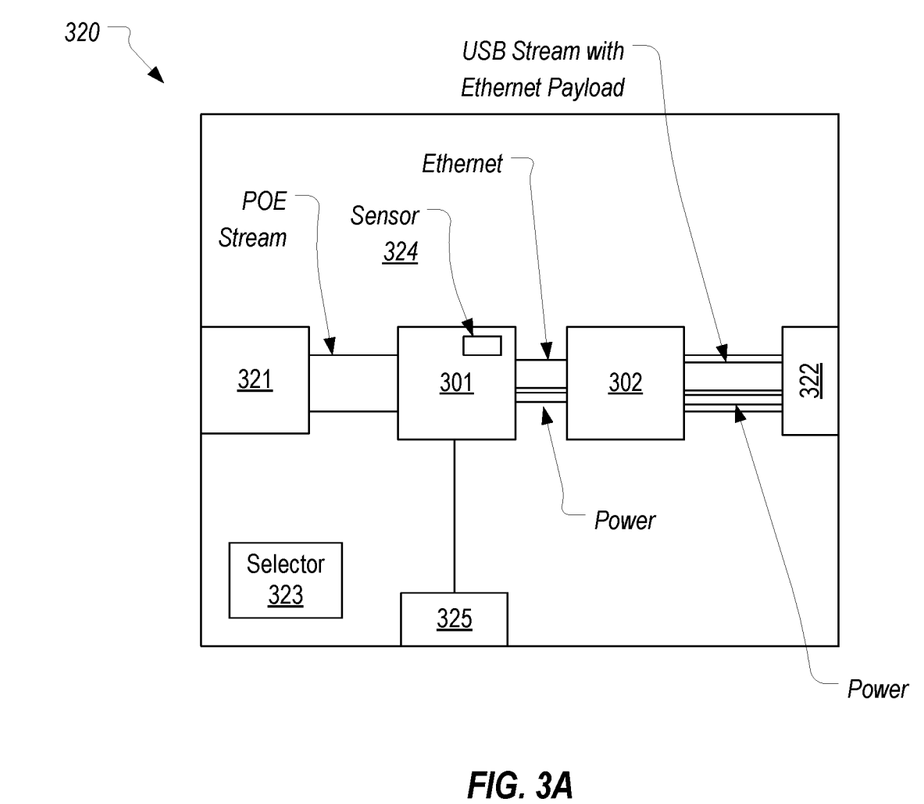
FIG. 3A illustrates another example architecture of the POE conversion device of FIG. 3.

FIG. 3A illustrates another example architecture of POE conversion device 320. As shown, POE conversion device 320 can include a selector 323 and/or a sensor 324 by which the voltage level of the power output to USB port 322 can be determined. Selector 323 can comprise a physical switch or other type of input device by which an end user can manually specify the voltage level. Sensor 324 can represent any component capable of detecting an appropriate voltage level to supply based on a type of cable connected to USB port 322 and/or communications received via USB port 322. In some embodiments, cables 351, 352 can be physically configured such that sensor 324 can automatically detect which voltage to provide. For example, USB connector 350 could be configured to present a voltage on a particular pin of USB port 322 which can indicate to sensor 324 which voltage should be provided.

In some embodiments, POE conversion device 320 may also include an additional USB port 325 which is powered by power module 301. USB port 325 could therefore be used to power and/or charge another external device.

Although not depicted in the figures, each of the variations described above with reference to FIGS. 2B and 2C could also be incorporated into POE conversion device 320. For example, a selector (and/or sensor) could be provided to allow the voltage that is provided to port 325 (which could be any type of port) to be adjusted. Similarly, power module 301 could be replaced with a power module/replicator to allow the POE stream to be passed through to an output Ethernet port.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A Power Over Ethernet (POE) conversion device comprising:
   an Ethernet port by which the POE conversion device receives an incoming POE stream;
   a USB port;
   a power output separate from the USB port;
   a power module comprising circuitry that is coupled to the Ethernet port to receive the incoming POE stream, wherein the power module extracts power from the incoming POE stream to form an incoming Ethernet stream, wherein the power module is coupled to the power output and provides the power to the power output; and
   a USB conversion module comprising circuitry that converts the incoming Ethernet stream into an incoming USB stream with an Ethernet payload and then outputs the incoming USB stream with the Ethernet payload via the USB port such that the USB stream with the Ethernet payload is output via the USB port while the power is separately output via the power output.

2. The POE conversion device of claim 1, wherein the USB conversion module also receives an outgoing USB stream with an Ethernet payload from the USB port, converts the outgoing USB stream with the Ethernet payload into an outgoing Ethernet stream and then outputs the outgoing Ethernet stream via the Ethernet port.

3. The POE conversion device of claim 1, wherein the power module converts the power to a particular voltage level prior to providing the power to the power output.

4. The POE conversion device of claim 3, wherein the power module converts the power to the particular voltage level based on user input.

5. The POE conversion device of claim 4, wherein the user input is received via a user input device.

6. The POE conversion device of claim 1, further comprising:
an output Ethernet port;
wherein the power module passes the incoming POE stream to the output Ethernet port to thereby allow the incoming POE stream to be supplied to an additional device.

7. The POE conversion device of claim 3, wherein the power module includes a sensor that detects the particular voltage level to provide based on a characteristic of or communication from an external device to which the POE conversion device is connected.

8. The POE conversion device of claim 1, further comprising:
an additional port;
wherein the power module is coupled to the additional port and supplies power to the additional port from the power extracted from the incoming POE stream.

9. The POE conversion device of claim 8, wherein the power module converts the power supplied to the additional port to a particular voltage level based on user input.

10. A POE conversion device comprising:
an Ethernet port by which the POE conversion device receives an incoming POE stream;
a USB port by which the POE conversion device connects to an external computing device;
a power module comprising circuitry that is coupled to the Ethernet port to receive the incoming POE stream, wherein the power module extracts power from the incoming POE stream to form an incoming Ethernet stream and separate power; and
a USB conversion module comprising circuitry that converts the incoming Ethernet stream into an incoming USB stream with an Ethernet payload, the incoming USB stream with the Ethernet payload being separate from the separate power, and then outputs the incoming USB stream with the Ethernet payload and the separate power via the USB port such that both the incoming USB stream with the Ethernet payload and the separate power are output to the external computing device via the USB port.

11. The POE conversion device of claim 10, further comprising:
one or more cables, each cable having a USB connector on one end by which the cable connects to the USB port, each cable splitting into a USB portion that provides the USB stream with the Ethernet payload to an opposing USB connector and a power portion that provides the separate power to a power connector.

12. The POE conversion device of claim 10, further comprising:
one or more cables, each cable having a first USB connector on one end by which the cable connects to the USB port, each cable being configured to provide the incoming USB stream with the Ethernet payload and the separate power to a second USB connector on an opposite end of the cable.

13. The POE conversion device of claim 10, wherein the USB conversion module also receives an outgoing USB stream with an Ethernet payload from the USB port, converts the outgoing USB stream with the Ethernet payload into an outgoing Ethernet stream and then outputs the outgoing Ethernet stream via the Ethernet port.

14. The POE conversion device of claim 10, further comprising:
a sensor that detects a type of cable connected to the USB port and causes the power module to convert the separate power to a particular voltage level based on the type of the cable.

15. The POE conversion device of claim 10, further comprising:
a user input device;
wherein the power module converts the separate power to a particular voltage level based on input received from the user input device.

16. The POE conversion device of claim 15, wherein the user input device is a switch such that the particular voltage level is based on a position of the switch.

17. The POE conversion device of claim 10, further comprising;
an additional port;
wherein the power module is configured to supply power to the additional port from the power extracted from the incoming POE stream.

18. A method, performed by a POE conversion device that includes an Ethernet port and a USB port, for converting a POE stream comprising:
receiving, via the Ethernet port, an incoming POE stream;
extracting power from the incoming POE stream to form an incoming Ethernet stream and separate power;
converting the incoming Ethernet stream into an incoming USB stream with an Ethernet payload;
outputting the USB stream with the Ethernet payload to an external device via the USB port; and
outputting the separate power to the external device.

19. The method of claim 18, wherein the separate power is output via a power output.

20. The method of claim 18, wherein the separate power is output via the USB port.

* * * * *